(12) United States Patent
Chen et al.

(10) Patent No.: US 12,177,879 B2
(45) Date of Patent: Dec. 24, 2024

(54) SIGNAL SENDING METHOD AND DEVICE, SIGNAL RECEIVING METHOD AND DEVICE, INFORMATION FEEDBACK METHOD AND DEVICE, COMMUNICATION NODE, AND MEDIUM

(71) Applicant: ZTE CORPORATION, Guangdong (CN)

(72) Inventors: Jie Chen, Shenzhen (CN); Youxiong Lu, Shenzhen (CN); Weimin Xing, Shenzhen (CN); Haigang He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 389 days.

(21) Appl. No.: 17/670,121

(22) Filed: Feb. 11, 2022

(65) Prior Publication Data

US 2022/0272717 A1    Aug. 25, 2022

Related U.S. Application Data

(63) Continuation of application No. PCT/CN2020/108901, filed on Aug. 13, 2020.

(30) Foreign Application Priority Data

Aug. 14, 2019   (CN) .......................... 201910749820.3

(51) Int. Cl.
*H04W 72/542*  (2023.01)
*H04L 5/00*  (2006.01)
(Continued)

(52) U.S. Cl.
CPC ......... *H04W 72/542* (2023.01); *H04L 5/0051* (2013.01); *H04W 72/02* (2013.01);
(Continued)

(58) Field of Classification Search
CPC .............. H04W 72/542; H04W 72/02; H04W 72/1263; H04W 72/20; H04W 72/23;
(Continued)

(56) References Cited

U.S. PATENT DOCUMENTS

| 2018/0323927 A1 | 11/2018 | Nagaraja et al. |
| 2019/0158319 A1 | 5/2019 | Cezanne et al. |

(Continued)

FOREIGN PATENT DOCUMENTS

| CN | 106793092 A | 5/2017 |
| CN | 108111199 A | 6/2018 |

(Continued)

OTHER PUBLICATIONS

Extended European Search Report for EP Appl. No. 20852544.4, dated Jul. 20, 2023 (11 pages).

(Continued)

*Primary Examiner* — Mang Hang Yeung
(74) *Attorney, Agent, or Firm* — Foley & Lardner LLP

(57) ABSTRACT

Provided are a signal sending method and device, a signal receiving method and device, an information feedback method and device, a communication node, and a medium. The method includes: acquiring configuration information of sidelink reference signal resources; and sending a channel state information reference signal on a sidelink data channel according to the configuration information, and indicating first indication information through sidelink control information.

12 Claims, 9 Drawing Sheets

Determine a feedback resource of sidelink channel state information according to set time information    ~310

Send the sidelink channel state information based on the feedback resource    ~320

(51) Int. Cl.
 *H04W 72/02*  (2009.01)
 *H04W 72/1263* (2023.01)
 *H04W 72/20*  (2023.01)
 *H04W 72/23*  (2023.01)

(52) U.S. Cl.
 CPC ....... *H04W 72/1263* (2013.01); *H04W 72/20* (2023.01); *H04W 72/23* (2023.01)

(58) Field of Classification Search
 CPC .... H04W 92/18; H04L 5/0051; H04L 5/0042; H04L 1/0075; H04L 5/0057; H04L 1/0073; H04L 1/0026; H04L 5/0094; H04L 5/005; H04L 1/1607; H04L 5/0048
 USPC ......................................................... 370/329
 See application file for complete search history.

(56) References Cited

U.S. PATENT DOCUMENTS

| | | | |
|---|---|---|---|
| 2020/0029340 A1* | 1/2020 | He | H04W 72/25 |
| 2022/0053513 A1* | 2/2022 | Ryu | H04W 72/1263 |
| 2022/0321291 A1* | 10/2022 | Yoshioka | H04W 72/0446 |

FOREIGN PATENT DOCUMENTS

| | | |
|---|---|---|
| CN | 109644455 A | 4/2019 |
| CN | 109981155 A | 7/2019 |
| CN | 110086582 A | 8/2019 |
| CN | 110535611 A | 12/2019 |
| EP | 4 088 401 A1 | 11/2022 |
| WO | WO-2019/056298 A1 | 3/2019 |
| WO | WO-2019/128873 A1 | 7/2019 |
| WO | WO-2021/140494 A1 | 7/2021 |

OTHER PUBLICATIONS

Interdigital Inc., "On Physical Layer Procedures for NR V2X Sidelink", 3GPP TSG RAN WG1 #97, R1-1907096, May 17, 2019, Reno, USA (9 pages).

Oppo, "Physical layer procedure for NR-V2X sidelink", 3GPP TSG RAN WG1 #97, R1-1906475, May 17, 2019, Reno, USA (12 pages).

International Search Report and Written Opinion for PCT Appl. No. PCT/CN2020/108901, mailed Nov. 4, 2020 (14 pages).

Samsung, "Functionalities of UE-Common PDCCH" 3GPP TSG RAN WG1 NR ad-Hoc#2, R1-1710698, Jun. 30, 2017, Qingdao, China (5 pages).

Examination Report for IN Appl. No. 202227006663, dated Dec. 29, 2023 (7 pages).

First Office Action for CN Appl. No. 201910749820.3, dated Jun. 28, 2024 (with English translation, 14 pages).

* cited by examiner

SIGNAL SENDING METHOD AND DEVICE, SIGNAL RECEIVING METHOD AND DEVICE, INFORMATION FEEDBACK METHOD AND DEVICE, COMMUNICATION NODE, AND MEDIUM

CROSS-REFERENCE TO RELATED APPLICATIONS

This application claims the benefit of priority under 35 U.S.C. § 120 as a continuation of PCT Patent Application No. PCT/CN2020/108901, filed on Aug. 13, 2020, which claims priority to Chinese Patent Application No. 201910749820.3, filed on Aug. 14, 2019, the disclosure of each of which is incorporated herein by reference in its entirety.

TECHNICAL FIELD

The present application relates to wireless communication networks, for example, a signal sending method and device, a signal receiving method and device, an information feedback method and device, a communication node, and a medium.

BACKGROUND

With the development of wireless communication technology and an increasing demand of a user for communication, sidelink communication can satisfy the communication requirements for low latency, high reliability and a high rate. In an application scenario of the sidelink communication, in the case where traffic needs to be transmitted between user equipments (UEs), traffic data is directly transmitted from a data source UE to a target UE through a sidelink without being forwarded by a network side, that is, without being forwarded through cellular links between the UEs and a base station, thereby reducing the burden of a cellular network, reducing power consumption, and satisfying the requirements of traffic with a high data rate and a proximity service. However, due to the lack of effective resource indications and information interaction between different UEs, channel measurement cannot be accurately performed on the sidelink so that the sidelink communication has relatively poor reliability.

SUMMARY

The present application provides a signal sending method and device, a signal receiving method and device, an information feedback method and device, a communication node, and a medium, so as to improve the reliability of sidelink communication.

Embodiments of the present application provide a signal sending method. The method is applied to a first user equipment and includes the following.

Configuration information of sidelink reference signal resources is acquired.

A channel state information reference signal (CSI-RS) is sent on a sidelink data channel according to the configuration information, and first indication information is indicated through sidelink control information (SCI).

Embodiments of the present application further provide a signal receiving method. The method is applied to a second user equipment and includes the following.

Indication information of a channel state information reference signal is received, where the indication information is used for indicating the number of ports and a resource position of the channel state information reference signal, and the indication information includes first indication information.

The channel state information reference signal is received according to the indication information.

Embodiments of the present application further provide an information feedback method. The method is applied to a second user equipment and includes the following.

A feedback resource of sidelink channel state information (CSI) is determined according to set time information.

The sidelink channel state information is sent based on the feedback resource.

Embodiments of the present application further provide a signal sending device. The device includes a configuration information acquisition module and a sending module.

The configuration information acquisition module is configured to acquire configuration information of sidelink reference signal resources.

The sending module is configured to send a channel state information reference signal on a sidelink data channel according to the configuration information and indicate first indication information through sidelink control information.

Embodiments of the present application further provide a signal receiving device. The device includes an indication information receiving module and a reference signal receiving module.

The indication information receiving module is configured to receive indication information of a channel state information reference signal, where the indication information is used for indicating the number of ports and a resource position of the channel state information reference signal, and the indication information includes first indication information.

The reference signal receiving module is configured to receive the channel state information reference signal according to the indication information.

Embodiments of the present application further provide an information feedback device. The device includes a feedback resource determination module and a feedback module.

The feedback resource determination module is configured to determine a feedback resource of sidelink channel state information according to set time information.

The feedback module is configured to send the sidelink channel state information based on the feedback resource.

Embodiments of the present application further provide a communication node.

The communication node includes one or more processors and a storage device.

The storage device is configured to store one or more programs.

The one or more programs are executed by the one or more processors to cause the one or more processors to perform the preceding signal sending method.

Embodiments of the present application further provide a communication node.

The communication node includes one or more processors and a storage device.

The storage device is configured to store one or more programs.

The one or more programs are executed by the one or more processors to cause the one or more processors to perform the preceding signal receiving method or information feedback method.

Embodiments of the present application further provide a computer-readable storage medium storing a computer program. The program, when executed by a processor, implements the preceding signal sending method, signal receiving method, or information feedback method.

DETAILED DESCRIPTION

Figure 1:
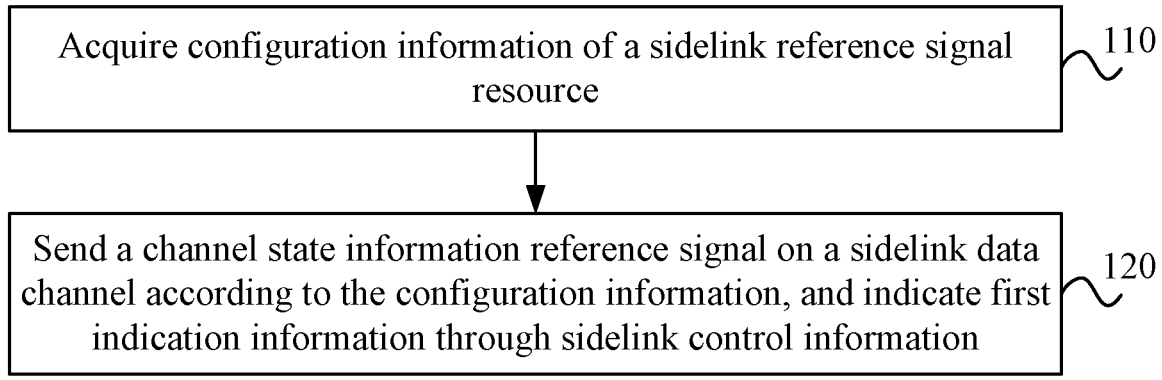
FIG. 1 is a flowchart of a signal sending method according to an embodiment.

The present application is described below in conjunction with drawings and embodiments. It is to be understood that the embodiments described herein are intended to illustrate the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

Sidelink communication technology can reduce the burden of the cellular network, reduce the battery power consumption of UEs, and improve the robustness of network infrastructure, which well satisfies the requirements for traffic with a high data rate and proximity services. Moreover, the sidelink communication technology supports direct communication without network coverage and satisfies special communication requirements such as public safety. In the 5th generation wireless systems (5G), the minimum resource unit in the time domain is a symbol, one slot in the time domain consists of 12 consecutive symbols having the extended cyclic prefix (ECP) or 14 consecutive symbols having the normal cyclic prefix (NCP), or a mini-slot in the time domain consists of one or more consecutive symbols (less than or equal to seven symbols). The minimum resource unit in the frequency domain is a subcarrier, the size of the subcarrier has a limited number of optional values (15 kHz, 30 kHz, 60 kHz, 120 kHz, or 240 kHz), and a resource block (RB) in the frequency domain consists of 12 consecutive subcarriers, where the RB is a resource unit for the configuration of frequency domain resources. In an application scenario of sidelink communication in a 5G communication system, based on the preceding resource units in the time domain and the frequency domain, a sidelink resource pool is composed of a group of resource units in the time domain and the frequency domain. In the resource pool, the UEs perform the sidelink communication according to configured or preconfigured resources.

In a 5G downlink cellular network, a base station uses the cyclic prefix orthogonal frequency-division multiplexing (CP-OFDM) waveform and uses a CSI-RS as a downlink channel measurement signal, and a UE feeds back CSI to the base station according to uplink scheduling indication information of the base station. In a sidelink communication system, sidelink channel measurement and feedback also needs to be performed between different UEs based on the CSI-RS. Due to the lack of effective information interaction, it is impossible to accurately perform channel measurement on a sidelink and feed back CSI, resulting in relatively poor reliability of the sidelink communication. A signal sending method, a signal receiving method, and an information feedback method in embodiments provide solutions for how a first UE sends a CSI-RS to a second UE, how the second UE receives the corresponding CSI-RS, and how the second UE feeds back CSI of a sidelink to the first UE, thereby improving the reliability of the sidelink communication.

FIG. 1 is a flowchart of a signal sending method according to an embodiment. The signal sending method provided in this embodiment is applied to a first user equipment. The first user equipment is a user equipment sending a CSI-RS in sidelink communication. As shown in FIG. 1, the method includes S110 and S120.

In S110, configuration information of sidelink reference signal resources is acquired.

In this embodiment, a sidelink resource pool is configured by a network side for a UE or preconfigured by a system, and the UE carries sidelink information by using a resource in the sidelink resource pool. The sidelink resource pool includes a physical sidelink control channel (PSCCH) resource and a physical sidelink shared channel (PSSCH) resource.

In this embodiment, information about a channel measurement reference signal resource of a sidelink is configured or preconfigured before channel measurement is performed on the sidelink, and the first UE and the second UE have the same understanding on the configuration information of the resources. Within the coverage of a serving node, available CSI-RS resources of the first UE may be configured by the network side via radio resource control (RRC) signaling and the available CSI-RS resources of the first UE may be indicated to the second UE via the RRC signaling of the network side or via sidelink RRC signaling of the first UE. Information about at least one set of available CSI-RS resources may be configured via the RRC signaling of the network side, where the information about the resources includes at least one of time domain information, frequency domain information, or code domain information of the CSI-RS, the number of ports, a resource density, or power information. In an out-of-coverage scenario, the available CSI-RS resources of the first UE may be determined by pre-configuration information, and the first UE indicates a CSI-RS resource used by the first UE to the second UE through sidelink physical layer indication information and/ or the sidelink RRC signaling.

In S120, channel state information reference signal is sent on a sidelink data channel according to the configuration information, and first indication information is indicated through sidelink control information.

Figure 2:
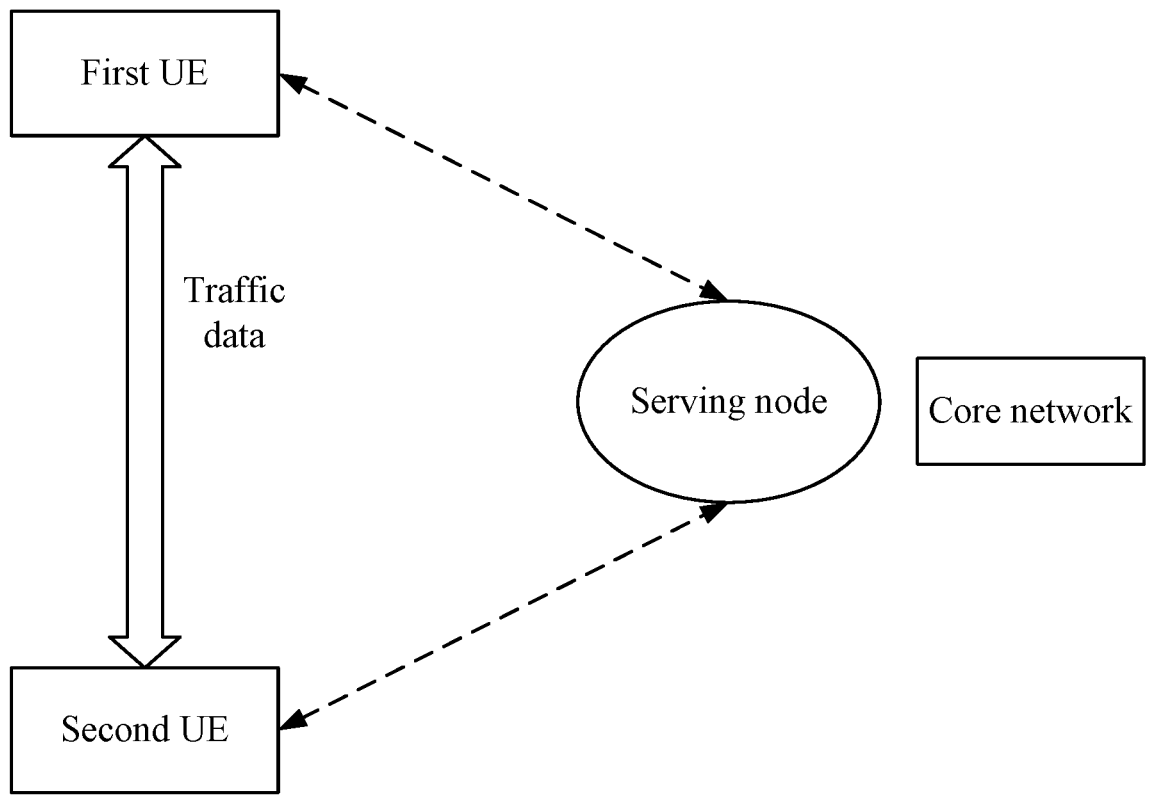
FIG. 2 is a schematic diagram of sidelink communication according to an embodiment.

FIG. 2 is a schematic diagram of sidelink communication according to an embodiment. As shown in FIG. 2, traffic data between the first UE and the second UE is directly transmitted from a data source UE to a target UE via the sidelink without being forwarded by the serving node or the network side of a core network (Core), that is, without being forwarded via cellular links between the UEs and the serving node. The serving node may be a base station, an evolved universal terrestrial radio access network (E-UTRAN) NodeB, an evolved NodeB (eNB), a next-generation NodeB (gNB), or the like.

In an embodiment, the first UE sends the CSI-RS on the sidelink data channel to the second UE according to the configuration information and indicates the first indication information to the second UE through the SCI. The first indication information is used for indicating information about a sidelink reference signal resource where the CSI-RS is located.

In a sidelink communication system, information is transmitted between UEs using a sidelink resource. According to specific application scenarios, traffic types, and the like, the manner of the sidelink communication includes device-to-device (D2D) communication, vehicle-to-vehicle (V2V) communication, vehicle-to-road side unit (RSU) (vehicle-to-infrastructure (V2I)) communication, and vehicle-to-pedestrian (V2P) communication, and the like.

Figure 3:
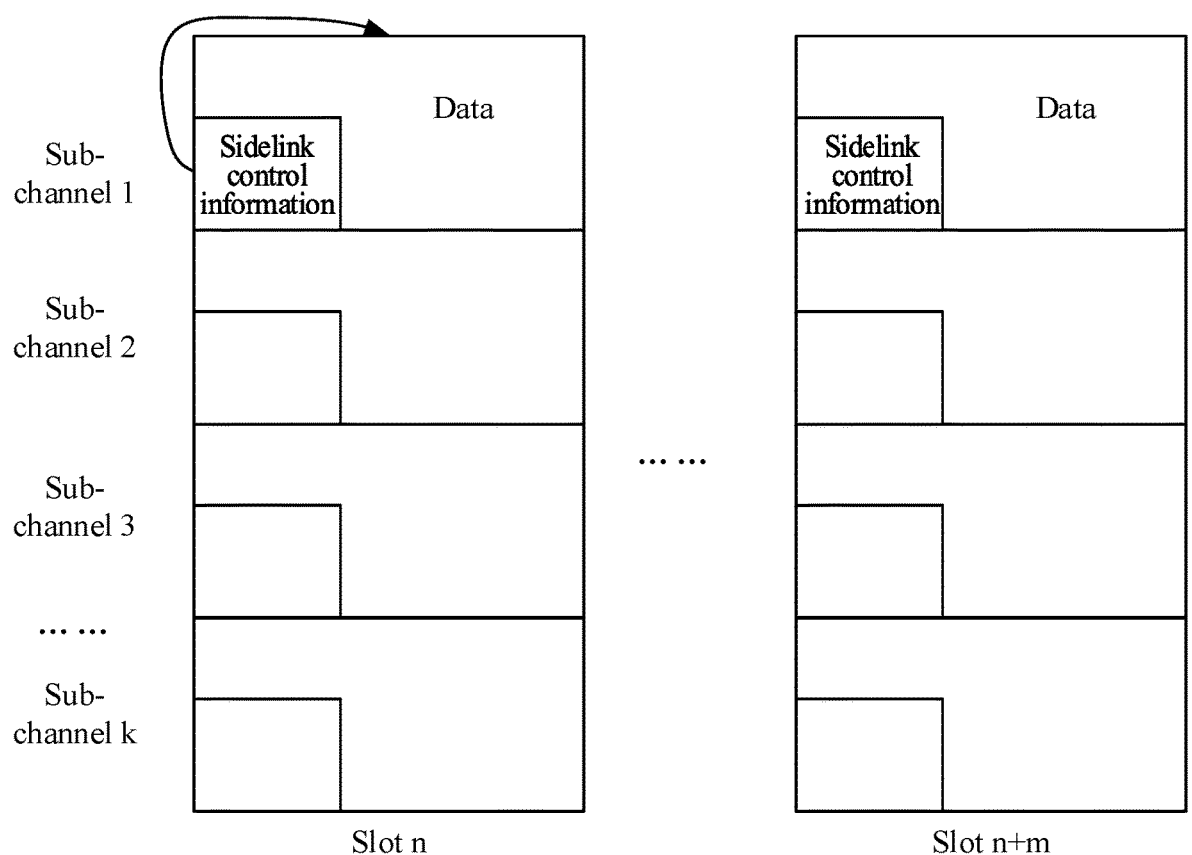
FIG. 3 is a schematic diagram illustrating that sidelink data is received according to an embodiment.

FIG. 3 is a schematic diagram illustrating that sidelink data is received according to an embodiment. As shown in FIG. 3, in new radio (NR) sidelink communication, the first UE sends the sidelink control information by using the PSCCH resource and sends the sidelink data by using the PSSCH resource, where a signal sent on the PSCCH or PSSCH resource must use the CP-OFDM waveform. Correspondingly, the second UE monitors resources in the sidelink resource pool and receives and processes the signal in the manner of receiving a CP-OFDM signal. The second UE receives the SCI through blind detection in a PSCCH resource pool. When the SCI is detected, the data on the PSSCH resource is further received according to an indication of the SCI. The PSSCH is composed of several sub-channels consisting of consecutive RBs in the frequency domain.

In an embodiment, the first UE sends the CSI-RS on the sidelink data channel (PSSCH) according to configuration or pre-configuration information of the network side and sends the first indication information on the sidelink control channel (PSCCH). The first indication information is used for indicating whether the CSI-RS exists, or indicating a CSI-RS resource index, or indicating the number of ports of the CSI-RS, or indicating the number of ports of the CSI-RS and a CSI-RS resource index under a specified number of ports. Based on the first indication information, the second UE may learn, according to a notification via the RRC signaling or the pre-configuration information, the CSI-RS resource corresponding to the first indication information. The RRC signaling may be the RRC signaling of the network side or the sidelink RRC signaling from the first UE. The second UE determines, according to the first indication information and the configuration information or pre-configuration information, a resource position at which the sidelink CSI-RS is transmitted so as to receive the reference signal and generate CSI feedback information of the sidelink.

According to the signal sending method in this embodiment, the first UE sends the CSI-RS according to the configuration or pre-configuration information and indicates the first indication information to the second UE through the SCI, so as to indicate the CSI-RS resource to the second UE so that the second UE receives the reference signal according to the first indication information (in conjunction with the RRC signaling), thereby measuring channel state information and improving the reliability of the sidelink communication.

In an embodiment, the sidelink reference signal resource is configured based on a sidelink resource pool, a sidelink bandwidth part (BWP), or a sidelink carrier; the configuration information of the sidelink reference signal resource is configured by the network side, or configured by the serving node, or acquired according to the pre-configuration information; and the configuration information of the sidelink reference signal resources includes at least one of the time domain information, the frequency domain information, or the code domain information of the CSI-RS, the number of ports, the resource density, or the power information. In an embodiment, the configuration information is defined by a resource pool, or defined by a user equipment (the first UE) sending the CSI-RS, or defined by the serving node, or predefined by a protocol.

In an embodiment, at least one set of sidelink reference signal resources are provided, each set corresponds to one type of the number of ports.

In an embodiment, the first indication information includes one-bit indication information and is used for indicating an existence state of the CSI-RS; the number of ports corresponding to the CSI-RS is determined via the sidelink RRC signaling of the first user equipment or RRC signaling of a cellular link; and resource position information corresponding to the CSI-RS is determined by a predefined rule, or via the sidelink RRC signaling of the first UE, or via the RRC signaling of the cellular link.

In this embodiment, a sidelink CSI-RS resource is configured or pre-configured based on the sidelink resource pool or the sidelink BWP or the sidelink carrier, and at least one CSI-RS resource is provided. The first UE transmits the sidelink CSI-RS in a slot and carries the first indication information of one bit in the sidelink control information of a control channel in the slot. A value of 0 of the one bit indicates that no CSI-RS is sent in the current transmission. A value of 1 indicates that the CSI-RS is sent in the current transmission. A parameter related to the CSI-RS in the current transmission is learned according to the configuration and/or pre-configuration information.

In an embodiment, the first indication information includes port indication information of a first number of bits and is used for indicating the number of ports corresponding to the CSI-RS; and resource position information corresponding to the CSI-RS under the number of ports is determined by the predefined rule, or via the sidelink RRC signaling of the first UE, or via the RRC signaling of the cellular link.

Figure 4:
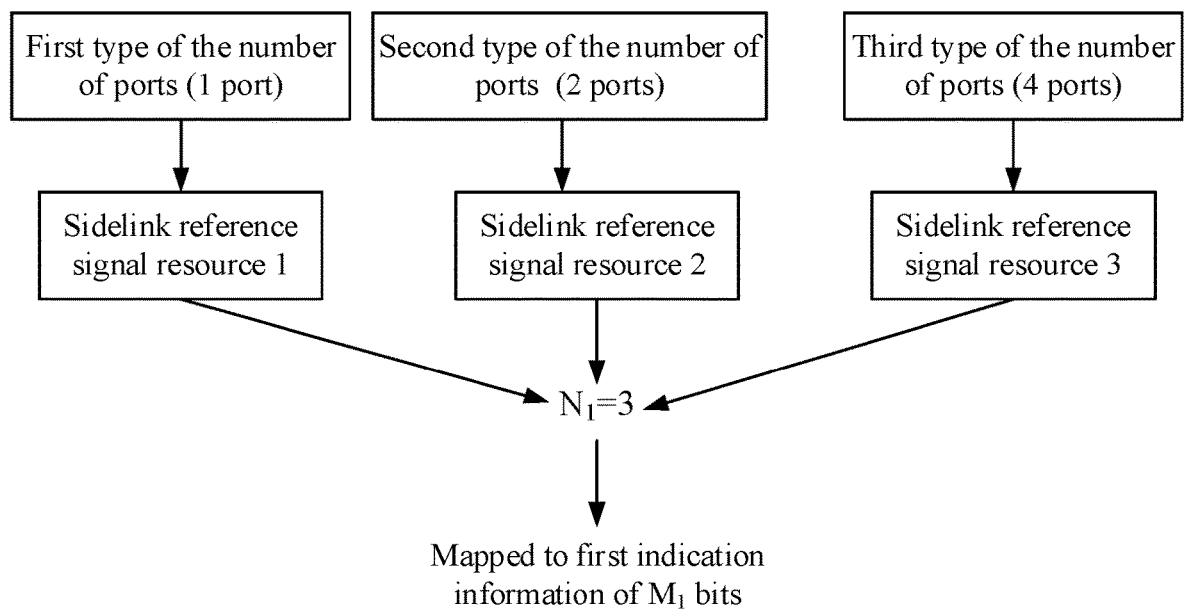
FIG. 4 is a schematic diagram of an indication of the number of ports corresponding to a sidelink channel state information reference signal according to an embodiment.

FIG. 4 is a schematic diagram of an indication of the number of ports corresponding to a sidelink channel state information reference signal according to an embodiment. In this embodiment, sidelink CSI-RS resources under a different number of antenna ports are configured or preconfigured based on the sidelink resource pool or the sidelink BWP or the sidelink carrier, and the configuration information of each set of CSI-RS resources includes at least one of the time domain information, the frequency domain information, or the code domain information of the CSI-RS, the resource density, or the power information. In this embodiment, types N1 of port numbers are mapped to binary bit information whose length is the first number (M1) of bits, a unique number of ports for the sidelink CSI-RS of the first UE may be determined according to the information of M1 bits, and resource indication information of the sidelink CSI-RS is obtained according to the determined number of ports and the configured or preconfigured resource position information corresponding to the number of ports. The first UE transmits the sidelink CSI-RS in a slot and carries the port indication information of M1 bits of the CSI-RS in the control information of the control channel in the slot. In FIG. 4, three types of port numbers are illustrated.

In an embodiment, the first indication information includes resource index indication information of a second number of bits and is used for indicating the number of ports corresponding to the CSI-RS and a CSI-RS resource index under the number of ports; and resource position information corresponding to the CSI-RS resource index is determined by the predefined rule, or via the sidelink RRC signaling of the first user equipment, or via the RRC signaling of the cellular link.

Figure 5:
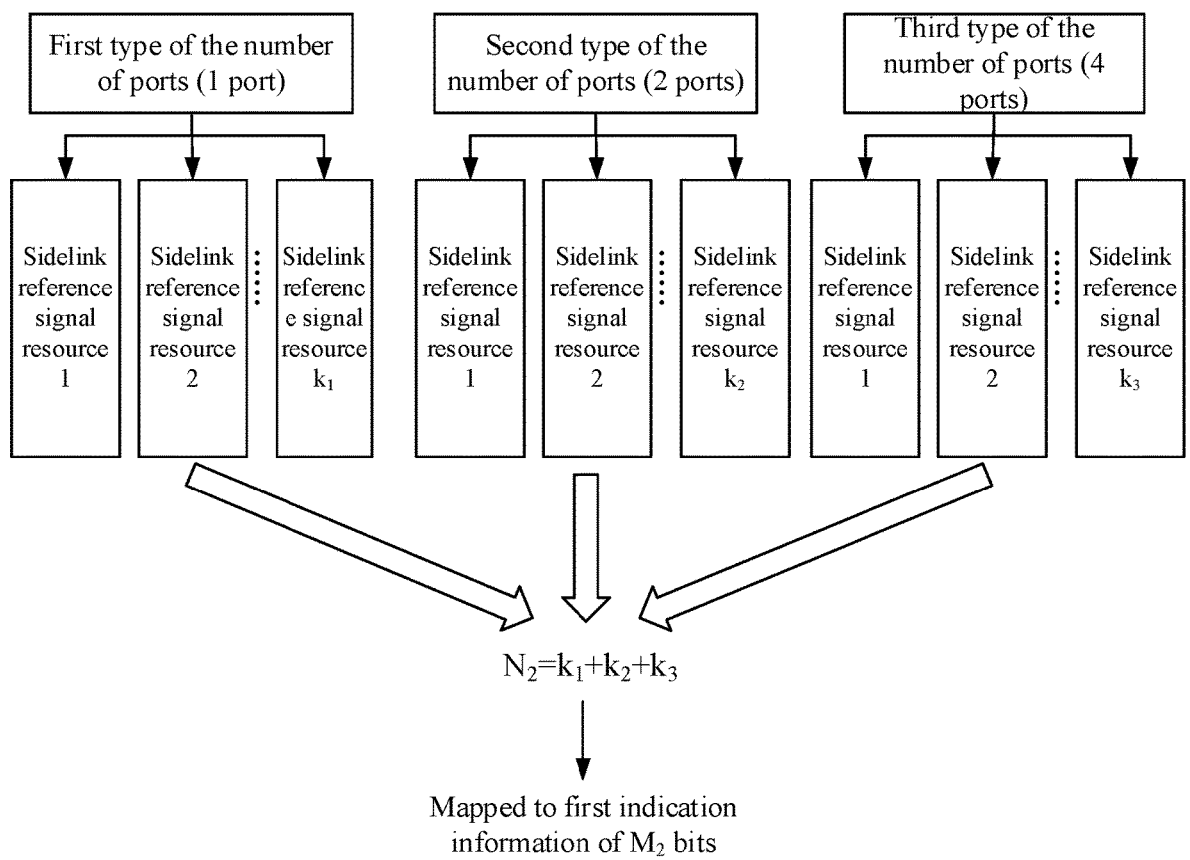
FIG. 5 is a schematic diagram of an indication of the number of ports and a resource index corresponding to a sidelink channel state information reference signal according to an embodiment.

FIG. 5 is a schematic diagram of an indication of the number of ports and a resource index corresponding to a sidelink channel state information reference signal according to an embodiment. In this embodiment, a total of N2 sets of available sidelink CSI-RS resources are configured or preconfigured for all types of port numbers based on the sidelink resource pool or the sidelink BWP or the sidelink carrier, and the configuration information of each set of CSI-RS resources includes at least one of the time domain information, the frequency domain information, or the code domain information of the CSI-RS, the resource density, or the power information. In this embodiment, the N2 sets of CSI-RS resources are mapped to binary bit information whose length is the second number (M2) of bits, and the information of M2 bits may uniquely indicate one set of sidelink CSI-RS resources among the N2 sets of available sidelink CSI-RS resources. The first UE transmits the sidelink CSI-RS in a slot and carries the indication information of M2 bits in the control information of the control channel in the slot. As shown in FIG. 5, three types of port numbers are illustrated, k1 CSI-RS resources are configured or preconfigured in the case where the number of ports is 1, k2 CSI-RS resources are configured or preconfigured in the case where the number of ports is 2, and k3 CSI-RS resources are configured or preconfigured in the case where the number of ports is 4; then, N2=k1+k2+k3, and N2 CSI-RS resources are quantified as binary bits and mapped to the binary bit information whose length is M2. The first UE indicates the first indication information in the SCI corresponding to a currently transmitted PSSCH including the CSI-RS.

In an embodiment, the first indication information includes resource index indication information of a third number of bits and is used for indicating a channel state information reference signal resource index under a set number of ports; the set number of ports is determined via the sidelink RRC signaling of the first UE or via the RRC signaling of the cellular link; and resource position information corresponding to the CSI-RS resource index is determined by the predefined rule, or via the sidelink RRC signaling of the first UE, or via the RRC signaling of the cellular link.

Figure 6:
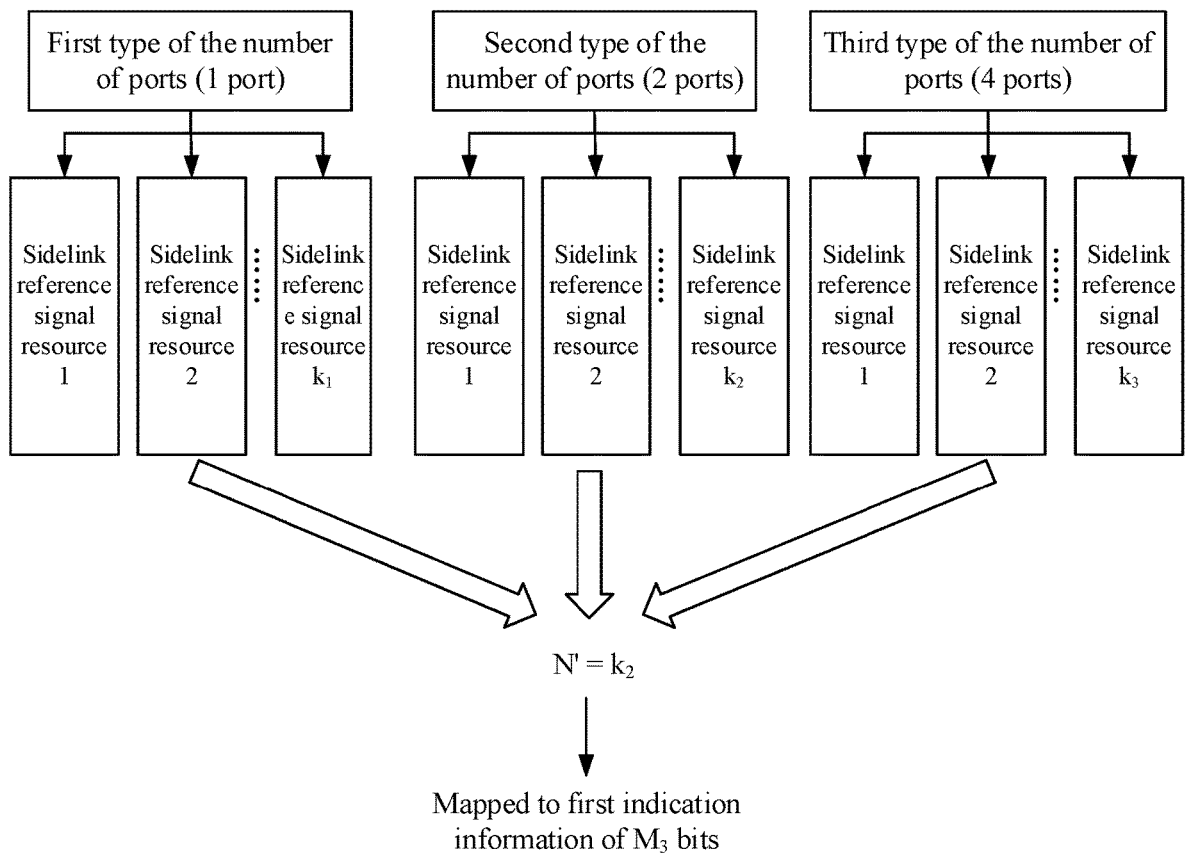
FIG. 6 is a schematic diagram of an indication of a resource index of a sidelink channel state information reference signal under a set number of ports according to an embodiment.

FIG. 6 is a schematic diagram of an indication of a resource index of a sidelink channel state information reference signal under a set number of ports according to an embodiment. In this embodiment, sidelink CSI-RS resources are configured or preconfigured based on the sidelink resource pool or the sidelink BWP or the sidelink carrier, and the configuration information of each set of CSI-RS resources includes at least one of the time domain information, the frequency domain information, or the code domain information of the CSI-RS, the resource density, or the power information. In this embodiment, N' CSI-RS resources are configured for a specific set number of ports and the number N' is mapped to binary bit information whose length is the third number (M3) of bits, and the information of M3 bits may uniquely indicate one set of specific sidelink CSI-RS resources among the available sidelink CSI-RS resources under the set number of ports. The first UE transmits the sidelink CSI-RS in a slot and carries the indication information of M3 bits in the control information of the control channel in the slot. As shown in FIG. 6, k1 CSI-RS resources are configured or preconfigured in the case where the number of ports is 1, k2 CSI-RS resources are configured or preconfigured in the case where the number of ports is 2, and k3 CSI-RS resources are configured or preconfigured in the case where the number of ports is 4. An example in which the set number of ports is configured or preconfigured to be 2 is used, in the case where the number of ports is 2, N'=k2, and N' is mapped to the first indication information of M3 bits. The first UE indicates the CSI-RS resource index under the set number of ports in the SCI corresponding to the currently transmitted PSSCH including the CSI-RS, and the set number of ports for the transmission of the CSI-RS may be indicated via the sidelink RRC signaling of the first UE or the RRC signaling of the cellular link.

In an embodiment, the first indication information includes resource index indication information of a fourth number of bits and is used for indicating a CSI-RS resource index under the number of ports configured with the maximum number of CSI-RS resources; the CSI-RS resource index is associated with a CSI-RS resource under another number of ports; the number of ports is determined via the sidelink RRC signaling of the first UE or via the RRC signaling of the cellular link; and the resource position information corresponding to the CSI-RS resource index is determined by the predefined rule, or via the sidelink RRC signaling of the first user equipment, or via the RRC signaling of the cellular link.

Figure 7:
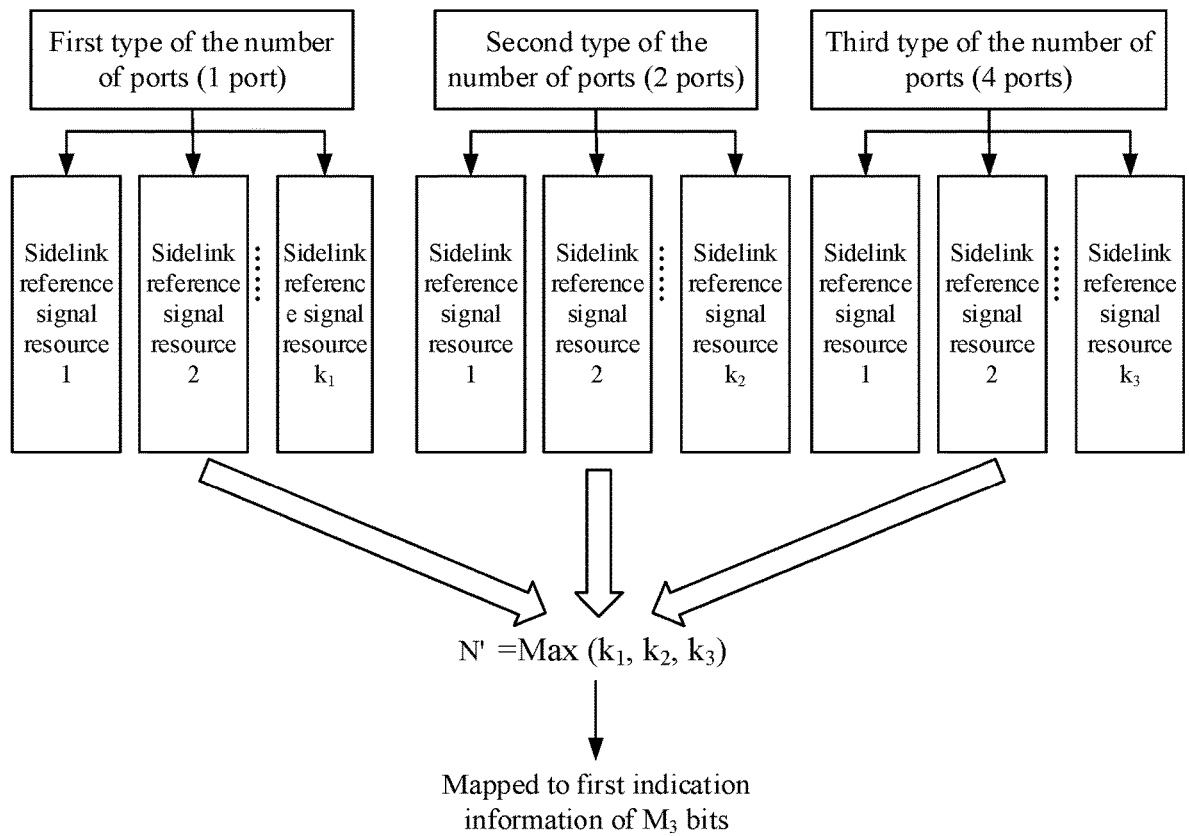
FIG. 7 is a schematic diagram of an indication of a resource index of a sidelink channel state information reference signal under the number of ports configured with the maximum number of resources according to an embodiment.

FIG. 7 is a schematic diagram of an indication of a resource index of a sidelink channel state information reference signal under the number of ports configured with a maximum number of resources according to an embodiment. In this embodiment, sidelink CSI-RS resources are configured or preconfigured based on the sidelink resource pool or the sidelink BWP or the sidelink carrier, and the configuration information of each set of CSI-RS resources includes at least one of the time domain information, the frequency domain information, or the code domain information of the CSI-RS, the resource density, or the power information. In this embodiment, for the number of ports configured with the maximum number of CSI-RS resources, N' CSI-RS resources are configured under the number of ports and the number N' is mapped to binary bit information whose length is the fourth number (M4) of bits. The information of M4 bits may uniquely indicate one set of specific sidelink CSI-RS resources among the available sidelink CSI-RS resources under the number of ports with the maximum number of resources. The first UE transmits the sidelink CSI-RS in a slot and carries the indication information of M4 bits in the control information of the control channel in the slot. As shown in FIG. 7, k1 CSI-RS resources are configured or preconfigured in the case where the number of ports is 1, k2 CSI-RS resources are configured or preconfigured in the case where the number of ports is 2, and k3 CSI-RS resources are configured or preconfigured in the case where the number of ports is 4. An example in which the number of ports configured with the maximum number of resources is 4 is used, that is, the maximum value among k1, k2, and k3 is k3. In this case, N'=k3, and N' is mapped to the first indication information of M4 bits. The first UE indicates the CSI-RS resource index when the number of ports is 4 in the SCI corresponding to the currently transmitted PSSCH including the CSI-RS. The number of ports and a resource position corresponding to the resource index may be indicated via the sidelink RRC signaling of the first UE or the RRC signaling of the cellular link or determined according to the predefined rule.

In an embodiment, the first indication information includes port indication information of a fifth number of bits and resource index indication information of a sixth number of bits; the port indication information is used for indicating the number of ports corresponding to the CSI-RS, and the resource index indication information is used for indicating the CSI-RS resource index under the number of ports; and the resource position information corresponding to the CSI-RS resource index is determined by the predefined rule, or via the sidelink RRC signaling of the first user equipment, or via the RRC signaling of the cellular link.

Figure 8:
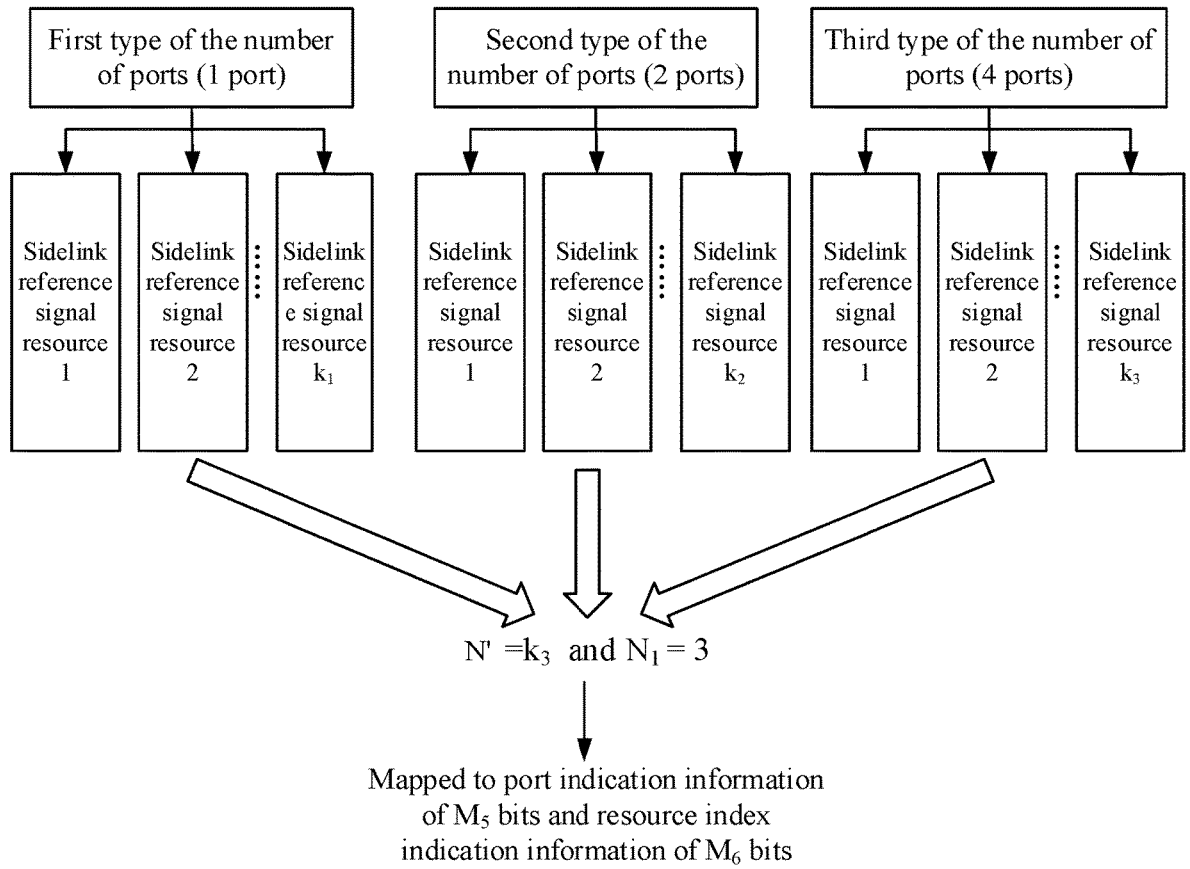
FIG. 8 is a schematic diagram of another indication of the number of ports and a resource index corresponding to a sidelink channel state information reference signal according to an embodiment.

FIG. 8 is a schematic diagram of another indication of the number of ports and a resource index corresponding to a sidelink channel state information reference signal according to an embodiment. In this embodiment, sidelink CSI-RS resources are configured or preconfigured based on the sidelink resource pool or the sidelink BWP or the sidelink carrier, and the configuration information of each set of CSI-RS resources includes at least one of the time domain information, the frequency domain information, or the code domain information of the CSI-RS, the resource density, or the power information. In this embodiment, N' CSI-RS resources are configured for one type of the number of ports, and the number N' is mapped to binary bit information whose length is a first number (M5) of bits, where the information of M5 bits may uniquely indicate a specific sidelink CSI-RS resource among the available sidelink CSI-RS resources under the number of ports; and the types N1 of port numbers configurable by the first UE is mapped to binary bit information whose length is the sixth number (M6) of bits, where the information of M6 bits may uniquely indicate the number of ports for the currently transmitted CSI-RS. The first UE transmits the sidelink CSI-RS in a slot and carries the indication information of M5 bits and the indication information of M6 bits in the control information of the control channel in the slot. As shown in FIG. 8, k1 CSI-RS resources are configured or preconfigured in the case where the number of ports is 1, k2 CSI-RS resources are configured or preconfigured in the case where the number of ports is 2, and k3 CSI-RS resources are configured or preconfigured in the case where the number of ports is 4. An example in which the number of ports is 4 is used, in this case, N'=k3, N' is mapped to the first indication information of M5 bits, and the types (N1=3) of the port numbers are mapped to the first indication information of M6 bits. The first UE indicates the CSI-RS resource index when the number of ports is 4 in the SCI corresponding to the currently transmitted PSSCH including the CSI-RS. The resource position corresponding to the resource index may be indicated via the sidelink RRC signaling of the first UE or the RRC signaling of the cellular link or determined according to the predefined rule.

In this embodiment, the port indication information of the fifth number of bits and the resource index indication information of the sixth number of bits are arranged in a predetermined order. The first indication information has M bits in total, which may be expressed as M=[M5 M6], where M5 bits are most significant bits (MSBs) among the M bits, and M6 bits are least significant bits (LSBs) among the M bits; alternatively, the M bits may be expressed as M=[M6 M5], where M6 bits are MSBs among the M bits, and M5 bits are LSBs among the M bits.

According to the signal sending method in this embodiment, the first UE sends the CSI-RS according to the configuration information and indicates the first indication information to the second UE through the SCI, so as to indicate the CSI-RS resource to the second UE so that the second UE receives the reference signal according to the first indication information (in conjunction with the RRC signaling), thereby measuring the channel state information and improving the reliability of the sidelink communication.

Embodiments of the present application further provide a signal receiving method applied to a second UE. The second UE is a user equipment that receives a CSI-RS and measures and feeds back a channel state.

Figure 9:
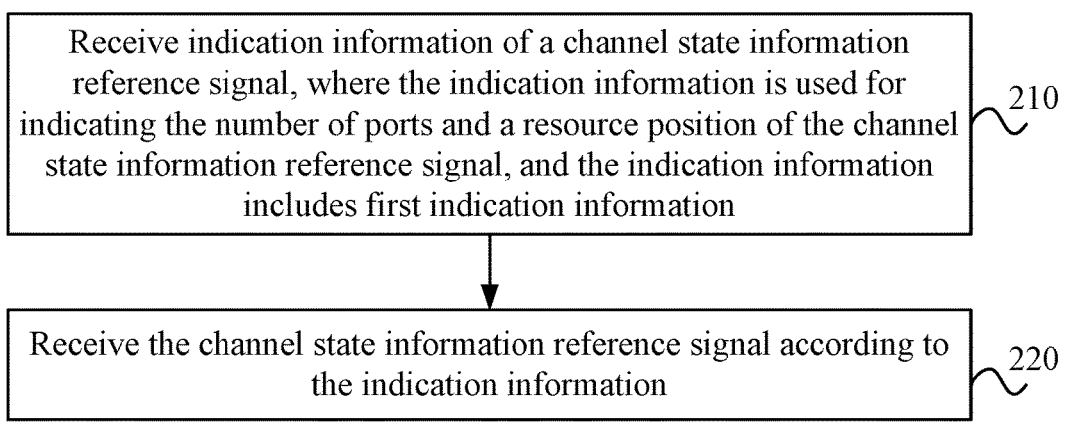
FIG. 9 is a flowchart of a signal receiving method according to an embodiment.

FIG. 9 is a flowchart of a signal receiving method according to an embodiment. As shown in FIG. 9, the method includes S210 and S220.

In S210, indication information of a channel state information reference signal is received, where the indication information is used for indicating the number of ports and a resource position of the channel state information reference signal, and the indication information includes first indication information.

In S220, the channel state information reference signal is received according to the indication information.

In an embodiment, the indication information further includes at least one of: sidelink RRC signaling of a first user equipment, RRC signaling of a cellular link, or a predefined rule.

In an embodiment, the first indication information may be one bit and used for indicating an existence state of the CSI-RS; and the indication information further includes at least one of: the predefined rule, the sidelink RRC signaling of the first UE, or the RRC signaling of the cellular link, which is used for indicating the number of ports and/or resource position information corresponding to the CSI-RS. The second UE may determine a resource position where the CSI-RS is located and receive the CSI-RS according to the indication information.

In an embodiment, the first indication information may be port indication information of a first number of bits and used for indicating the number of ports corresponding to the CSI-RS; and the indication information further includes at least one of: the predefined rule, the sidelink RRC signaling of the first UE, or the RRC signaling of the cellular link, which is used for indicating the resource position information under the number of ports. The second UE may determine the resource position where the CSI-RS is located and receive the CSI-RS according to the indication information.

In an embodiment, the first indication information may be resource index indication information of a second number of bits and used for indicating the number of ports corresponding to the CSI-RS and a resource index under the number of ports; and the indication information further includes at least one of: the predefined rule, the sidelink RRC signaling of the first UE, or the RRC signaling of the cellular link, which is used for indicating the resource position information corresponding to the resource index under the number of ports. The second UE may determine the resource position where the CSI-RS is located and receive the CSI-RS according to the indication information.

In an embodiment, the first indication information may be resource index indication information of a third number of bits and used for indicating a resource index under a set number of ports; and the indication information further includes at least one of: the predefined rule, the sidelink RRC signaling of the first UE, or the RRC signaling of the cellular link, which is used for indicating the set number of ports and/or the resource position information corresponding to the resource index under the set number of ports. The second UE may determine the resource position where the CSI-RS is located and receive the CSI-RS according to the indication information.

In an embodiment, the first indication information may be resource index indication information of a fourth number of bits and used for indicating a resource index under the number of ports configured with the maximum number of CSI-RS resources; and the indication information further includes at least one of: the predefined rule, the sidelink RRC signaling of the first UE, or the RRC signaling of the cellular link, which is used for indicating the number of ports and/or the resource position information corresponding to the resource index. The second UE may determine the resource position where the CSI-RS is located and receive the CSI-RS according to the indication information.

In an embodiment, the first indication information may be port indication information of a fifth number of bits and resource index indication information of a sixth number of bits and used for indicating the number of ports corresponding to the CSI-RS and a CSI-RS resource index under the number of ports, respectively; and the indication information further includes at least one of: the predefined rule, the sidelink RRC signaling of the first UE, or the RRC signaling of the cellular link, which is used for indicating the resource position information corresponding to the resource index. The second UE may determine the resource position where the CSI-RS is located and receive the CSI-RS according to the indication information.

According to the signal receiving method in this embodiment, the second UE determines the number of ports and the resource position of the CSI-RS resource according to the indication information to accurately receive the CSI-RS, thereby measuring the channel state and improving the reliability of sidelink communication.

Embodiments of the present application further provide an information feedback method applied to a second UE. The second UE is a user equipment that receives a CSI-RS and measures and feeds back a channel state.

Figure 10:
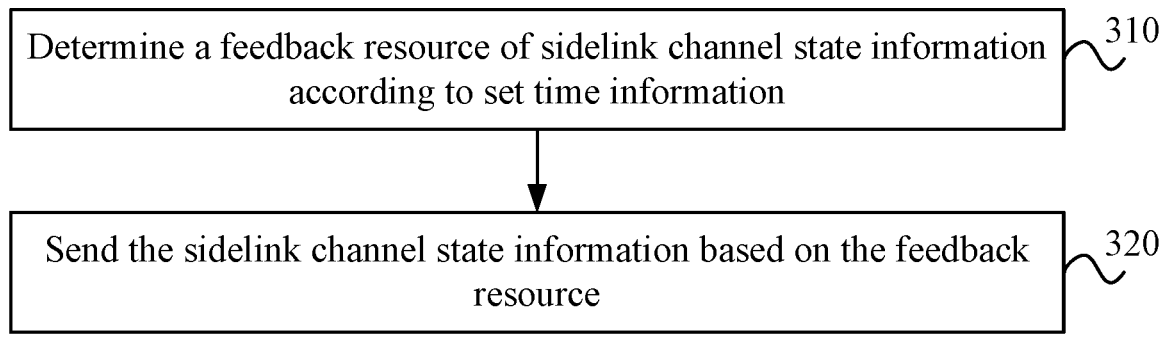
FIG. 10 is a flowchart of an information feedback method according to an embodiment.

FIG. 10 is a flowchart of an information feedback method according to an embodiment. As shown in FIG. 10, the method includes S310 and S320.

In S310, a feedback resource of sidelink channel state information is determined according to set time information.

In S320, the sidelink channel state information is sent based on the feedback resource.

In this embodiment, the second UE determines the feedback resource of the CSI according to the set time information. For example, existing grant information of a PSSCH is detected within a configured or preconfigured time window, and the feedback resource of the CSI is determined according to the detected grant information. Alternatively, the feedback resource is re-determined within the configured or preconfigured time window. The second UE feeds back the sidelink CSI to a first UE based on the determined feedback resource, thereby implementing the channel state measurement of a sidelink and improving the reliability of sidelink communication.

In an embodiment, the set time information includes a set time window; and that the feedback resource of the sidelink channel state information is determined according to the set time information includes the following: in the case where grant information of a physical sidelink shared channel (PSSCH) exists within the set time window, determining the feedback resource of the sidelink channel state information according to the grant information; and in the case where the grant information of the PSSCH does not exist within the set time window, re-acquiring the feedback resource of the sidelink channel state information.

In this embodiment, after receiving the CSI-RS on the sidelink, the second UE determines whether valid sidelink grant information exists within one configured or preconfigured time window. If at least one valid sidelink grant exists, the second UE rate matches sidelink CSI data onto a sidelink data channel according to a predefined rule to send the sidelink CSI data together with data and indicates a state of the CSI in the control information. For example, it is indicated that the currently sent data channel includes only the CSI, or only the data, or both the CSI and the data. The grant may be the dynamic grant, or the configured grant, or the semi-persistent scheduling (SPS) grant.

For example, in the case where the dynamic grant of a network side exists within the time window, the second UE multiplexes the CSI into one PSSCH indicated by the dynamic grant within the set time window for transmission. In the case where the configured grant of the network side exists within the set time window, the second UE multiplexes the CSI into one PSSCH indicated by the configured grant within the set time window for transmission. In the case where the second UE is within coverage and no sidelink grant exists within the set time window, the second UE may trigger a scheduling request (SR) or a buffer status report (BSR) to re-request the feedback resource of the CSI. Alternatively, in the case where the second UE has a sidelink grant from the MAC layer, the second UE multiplexes the CSI into a PSSCH indicated by the grant for transmission, where the grant may be the SPS grant or may be dynamically selected. Alternatively, in the case where the second UE has no sidelink grant within the set time window, the second UE triggers autonomous resource selection and then obtains information about the feedback resource for sending the sidelink CSI. In the case where the second UE determines the sidelink grant for sending the CSI, the CSI is transmitted in the PSSCH indicated by the grant information, where the sidelink CSI together with the data on the sidelink is subjected to the rate matching according to the predefined rule onto the PSSCH to be sent, or the CSI is sent separately on the PSSCH.

In an embodiment, the start time of the set time window is a sum of a first time offset and the time when the CSI-RS is received, and the end time of the set time window is a sum of a second time offset and the time when the CSI-RS is received; the second time offset is greater than the first time offset; and the second time offset and the first time offset are configured by a UE, or configured by a serving node, or determined by a predefined rule.

In this embodiment, the set time window may be expressed as [n+offset1, n+offset2], where n denotes the time when the second UE receives the sidelink CSI-RS sent by the first UE, offset1 denotes the first time offset, offset2 denotes the second time offset, and offset1 and offset2 are configured or pre-configured parameters of the time window. When offset1 is not configured, the value of offset1 is 1. The second UE determines whether the grant information exists within the set time window.

In an embodiment, the set time information includes the set time; and that the feedback resource of the sidelink channel state information is determined according to the set time information includes the following: after the set time, re-acquiring the feedback resource of the sidelink channel state information, where the set time is a sum of a third time offset and the time when the channel state information reference signal is received.

In this embodiment, the set time may be expressed as n+offset3, where n denotes the time when the second UE receives the sidelink CSI-RS sent by the first UE, and offset3 denotes the third time offset and is a configured or preconfigured parameter of the time window. After the set time, the second UE re-determines the feedback resource of the CSI.

In an embodiment, that the feedback resource of the sidelink channel state information is re-acquired includes: triggering the logical channel parameter setting and/or the logical channel establishment of the feedback resource, and acquiring grant information of the feedback resource carried in a physical layer. In this embodiment, the MAC layer performs the corresponding logical channel processing according to a logical channel parameter used for CSI feedback, but a bearer of the CSI feedback may not be packaged in a MAC service data unit (SDU). MAC sends a scheduling result to the physical layer and notifies scheduling information for the CSI feedback in the scheduling result, and the physical layer maps CSI feedback information to an RB used for scheduling according to the scheduling result.

In an embodiment, that the feedback resource of the sidelink channel state information is re-acquired includes: triggering the creation of a sidelink radio bearer and a related parameter of the feedback resource, and acquiring the grant information of the feedback resource carried in the physical layer.

In an embodiment, the MAC layer uses a logical channel for the CSI feedback or creates a sidelink radio bearer (SLRB) for carrying the CSI feedback and assigns parameters such as a priority, a buffer size, and the content of a MAC layer payload to the logical channel or the SLRB according to a certain rule, where the rule may be predefined or determined according to a feedback format of the CSI-RS. For example, for feedback format one, the rule is to assign a priority of 0 and a buffer size of 5 bits; for feedback format two, the rule is to assign a priority of 1 and a buffer size of 10 bits; and so on.

In an embodiment, that the feedback resource of the sidelink channel state information is re-acquired includes: triggering the media access control (MAC) scheduling of the feedback resource, and acquiring the grant information of the feedback resource carried in the physical layer.

In an embodiment, that the feedback resource of the sidelink channel state information is re-acquired includes: triggering the scheduling request (SR) or the buffer status report (BSR), and acquiring a feedback resource on the sidelink indicated by the serving node.

In this embodiment, after receiving the CSI-RS on the sidelink, the UE in mode1 triggers the SR or the BSR and requests the resource for sending the CSI from the serving node. The BSR may include a predefined logical channel number or logical channel group number corresponding to the CSI data and information such as a buffer size and a priority of the CSI. The serving node allocates the resource for sending the CSI on the sidelink to the second UE. The second UE indicates the state of the CSI in the control information to indicate that the currently sent data channel includes only the CSI, or only the data, or both the CSI and the data.

In an embodiment, that the feedback resource of the sidelink channel state information is re-acquired includes: selecting the feedback resource according to a buffer size of feedback data of channel state measurement or a predefined number of resources; or using a resource indicated by the network side or the serving node as the feedback resource; or autonomously selecting a resource as the feedback resource.

In this embodiment, after the second UE in mode2 receives the CSI-RS on the sidelink, the second UE may select the feedback resource on the sidelink according to the buffer size of the CSI data or the predefined number of resources, send the CSI data on the selected sidelink resource, and indicate the state of the CSI in the control information corresponding to the resource to indicate that the currently sent data channel includes only the CSI, or only the data, or both the CSI and the data. The second UE may also use the resource indicated by the network side or the serving node as the feedback resource. The second UE may also autonomously select a resource. For example, the second UE triggers resource scheduling of the MAC layer and obtains resource information for the CSI feedback in the physical layer. Alternatively, the second UE triggers the logical channel parameter setting and/or the logical channel establishment for the CSI feedback and further obtains the grant information of the CSI feedback carried in the physical layer. Alternatively, the second UE triggers the creation of the sidelink radio bearer (SLRB) and the related parameter for the CSI feedback and further obtains the grant information of the CSI feedback carried in the physical layer.

In an embodiment, that the feedback resource of the sidelink channel state information is determined according to the grant information includes: using a resource indicated by existing dynamic grant information of the sidelink within the set time window as the feedback resource; or using a resource indicated by existing grant information configured for the sidelink within the set time window as the feedback resource; or using a resource indicated by an existing semi-persistent scheduling grant for the sidelink within the set time window as the feedback resource.

In an embodiment, the method further includes: sending second indication information in sidelink control information corresponding to the sidelink channel state information, where the second indication information is used for indicating a feedback state of the sidelink channel state information. In this embodiment, the second UE sends the second indication information on a PSCCH corresponding to the PSSCH where the CSI feedback is located to indicate a transmission manner and a transmission format of the CSI. For example, whether the PSSCH currently sent by the second UE includes the CSI is indicated, the transmission format of the currently transmitted CSI is indicated, and so on.

In an embodiment, the feedback state includes at least one of a feedback manner of the CSI or a feedback format of the CSI.

In an embodiment, the feedback manner includes at least one of the following: currently sent sidelink data includes sidelink traffic data; currently sent sidelink data includes feedback information of sidelink channel state measurement; or currently sent sidelink data includes sidelink traffic data and feedback information of sidelink channel state measurement.

In an embodiment, the feedback format includes at least one of the following: a multiplexing relationship between the feedback information and the PSSCH; a modulation manner of the CSI; a coding manner of the CSI; a code rate of the CSI; the content of the CSI; or the number of layers of the CSI-RS.

According to the information feedback method in this embodiment, the second UE determines the feedback resource of the CSI according to the set time information or re-acquires the feedback resource and feeds back the sidelink CSI to the first UE based on the determined feedback resource, thereby implementing the channel state measurement of the sidelink and improving the reliability of the sidelink communication.

Figure 11:
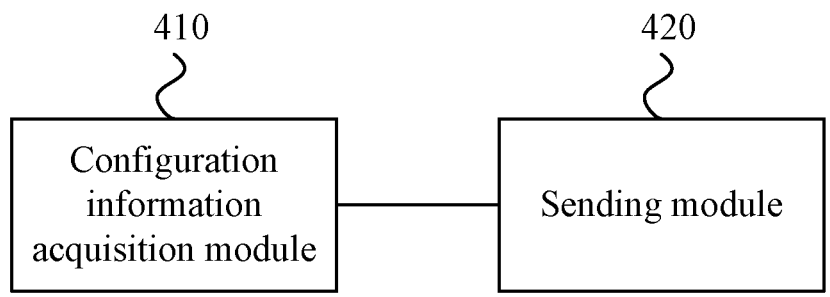
FIG. 11 is a structural diagram of a signal sending device according to an embodiment.

Embodiments of the present application further provide a signal sending device. FIG. 11 is a structural diagram of a signal sending device according to an embodiment. As shown in FIG. 11, the signal sending device includes a configuration information acquisition module 410 and a sending module 420.

The configuration information acquisition module 410 is configured to acquire configuration information of sidelink reference signal resources. The sending module 420 is configured to send a channel state information reference signal on a sidelink data channel according to the configuration information and indicate first indication information through sidelink control information.

In an embodiment, the sidelink reference signal resource is configured based on a sidelink resource pool, a sidelink bandwidth part, or a sidelink carrier; the configuration information of the sidelink reference signal resources is configured by a network side, or configured by a serving node, or acquired according to pre-configuration information; and the configuration information of the sidelink reference signal resources includes at least one of: time domain information of the channel state information reference signal, frequency domain information of the channel state information reference signal, code domain information of the channel state information reference signal, the number of ports, a resource density, or power information.

In an embodiment, the configuration information is defined by a resource pool, or defined by a user equipment sending the channel state information reference signal, or defined by the serving node, or predefined by a protocol.

In an embodiment, at least one set of sidelink reference signal resources are provided, each set corresponds to one type of the number of ports.

In an embodiment, the first indication information includes one-bit indication information and is used for indicating an existence state of the channel state information reference signal; the number of ports corresponding to the channel state information reference signal is determined via sidelink radio resource control (RRC) signaling of the first UE or via RRC signaling of a cellular link; and resource position information corresponding to the channel state information reference signal is determined by a predefined rule, or via the sidelink RRC signaling of the first UE, or via the RRC signaling of the cellular link.

In an embodiment, the first indication information includes port indication information of a first number of bits and is used for indicating the number of ports corresponding to the channel state information reference signal; and resource position information corresponding to the channel state information reference signal under the number of ports is determined by the predefined rule, or via the sidelink RRC signaling of the first UE, or via the RRC signaling of the cellular link.

In an embodiment, the first indication information includes resource index indication information of a second number of bits and is used for indicating the number of ports corresponding to the channel state information reference signal and a channel state information reference signal resource index under the number of ports; and resource position information corresponding to the channel state information reference signal resource index is determined by the predefined rule, or via the sidelink RRC signaling of the first UE, or via the RRC signaling of the cellular link.

In an embodiment, the first indication information includes resource index indication information of a third number of bits and is used for indicating a channel state information reference signal resource index under a set number of ports; the set number of ports is determined via the sidelink RRC signaling of the first UE or via the RRC signaling of the cellular link; and resource position information corresponding to the channel state information reference signal resource index is determined by the predefined rule, or via the sidelink RRC signaling of the first UE, or via the RRC signaling of the cellular link.

In an embodiment, the first indication information includes resource index indication information of a fourth number of bits and is used for indicating a channel state information reference signal resource index under the number of ports configured with the maximum number of channel state information reference signal resources; the channel state information reference signal resource index is associated with a channel state information reference signal resource under another number of ports; the number of ports is determined via the sidelink RRC signaling of the first UE or via the RRC signaling of the cellular link; and the resource position information corresponding to the channel state information reference signal resource index is determined by the predefined rule, or via the sidelink RRC signaling of the first UE, or via the RRC signaling of the cellular link.

In an embodiment, the first indication information includes port indication information of a fifth number of bits and resource index indication information of a sixth number of bits; the port indication information is used for indicating the number of ports corresponding to the channel state information reference signal, and the resource index indication information is used for indicating the channel state information reference signal resource index under the number of ports; and the resource position information corresponding to the channel state information reference signal resource index is determined by the predefined rule, or via the sidelink RRC signaling of the first UE, or via the RRC signaling of the cellular link.

According to the signal sending device in this embodiment, the configuration information acquisition module acquires the configuration information of the sidelink reference signal resources, and the sending module sends the channel state information reference signal on the sidelink data channel according to the configuration information and indicates the first indication information through the sidelink control information to indicate a CSI-RS resource to a second UE so that the second UE receives the reference signal according to the first indication information (in conjunction with the RRC signaling), thereby measuring channel state information and improving the reliability of sidelink communication.

Figure 12:
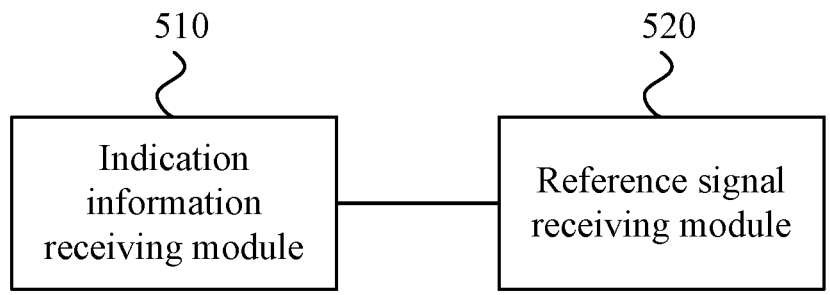
FIG. 12 is a structural diagram of a signal receiving device according to an embodiment.

Embodiments of the present application further provide a signal receiving device. FIG. 12 is a structural diagram of a signal receiving device according to an embodiment. As shown in FIG. 12, the signal receiving device includes an indication information receiving module 510 and a reference signal receiving module 520.

The indication information receiving module 510 is configured to receive indication information of a channel state information reference signal, where the indication information is used for indicating the number of ports and a resource position of the channel state information reference signal, and the indication information includes first indication information. The reference signal receiving module 520 is configured to receive the channel state information reference signal according to the indication information.

In an embodiment, the indication information further includes at least one of: sidelink RRC signaling of a first UE, RRC signaling of a cellular link, or a predefined rule.

According to the signal receiving device in this embodiment, the indication information receiving module receives the indication information to determine the number of ports and the resource position of the CSI-RS, and the reference signal receiving module accurately receives the CSI-RS according to the indication information, thereby implementing the channel state measurement and improving the reliability of sidelink communication.

Figure 13:
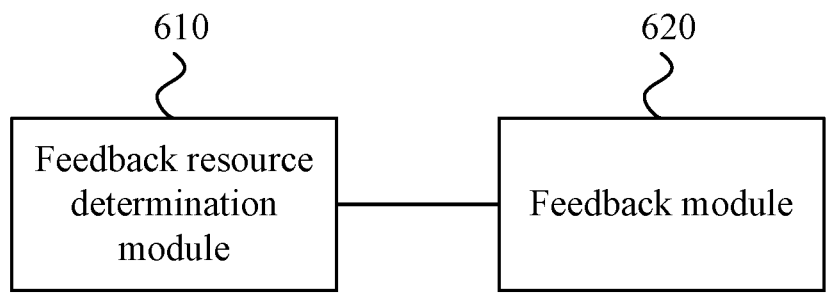
FIG. 13 is a structural diagram of an information feedback device according to an embodiment.

Embodiments of the present application further provide an information feedback device. FIG. 13 is a structural diagram of an information feedback device according to an embodiment. As shown in FIG. 13, the information feedback device includes a feedback resource determination module 610 and a feedback module 620.

The feedback resource determination module 610 is configured to determine a feedback resource of sidelink channel state information according to set time information. The feedback module 620 is configured to send the sidelink channel state information based on the feedback resource.

In an embodiment, the set time information includes a set time window; and the feedback resource determination module 610 includes a first resource determination unit and a second resource determination unit. The first resource determination unit is configured to, in the case where grant information of a physical sidelink shared channel (PSSCH) exists within the set time window, determine the feedback resource of the sidelink channel state information according to the grant information. The second resource determination unit is configured to, in the case where the grant information of the PSSCH does not exist within the set time window, re-acquire the feedback resource of the sidelink channel state information.

In an embodiment, the start time of the set time window is a sum of a first time offset and the time when a channel state information reference signal is received, and the end time of the set time window is a sum of a second time offset and the time when the channel state information reference signal is received; the second time offset is greater than the first time offset; and the second time offset and the first time offset are configured by a user equipment, configured by a serving node, or determined by a predefined rule.

In an embodiment, the set time information includes the set time; and the feedback resource determination module 610 includes a third resource determination unit, which is configured to, after the set time, re-acquire the feedback resource of the sidelink channel state information. The set time is a sum of a third time offset and the time when the channel state information reference signal is received. In an embodiment, that the feedback resource of the sidelink channel state information is re-acquired includes: triggering a logical channel parameter setting and/or a logical channel establishment of the feedback resource, and acquiring grant information of the feedback resource carried in a physical layer.

In an embodiment, that the feedback resource of the sidelink channel state information is re-acquired includes: triggering creation of a sidelink radio bearer and a related parameter of the feedback resource, and acquiring the grant information of the feedback resource carried in the physical layer.

In an embodiment, that the feedback resource of the sidelink channel state information is re-acquired includes: triggering media access control (MAC) scheduling of the feedback resource, and acquiring the grant information of the feedback resource carried in the physical layer.

In an embodiment, that the feedback resource of the sidelink channel state information is re-acquired includes: triggering a scheduling request or a buffer status report, and acquiring a feedback resource on a sidelink indicated by the serving node.

In an embodiment, that the feedback resource of the sidelink channel state information is re-acquired includes: selecting the feedback resource according to a buffer size of feedback data of channel state measurement or a predefined number of resources; or using a resource indicated by a network side or the serving node as the feedback resource; or autonomously selecting a resource as the feedback resource.

In an embodiment, the first resource determination unit is configured to: use a resource indicated by existing dynamic grant information of the sidelink within the set time window as the feedback resource; or use a resource indicated by existing grant information configured for the sidelink within the set time window as the feedback resource; or use a resource indicated by an existing semi-persistent scheduling grant for the sidelink within the set time window as the feedback resource.

In an embodiment, the device further includes an indication module. The indication module is configured to send second indication information in sidelink control information corresponding to the sidelink channel state information, where the second indication information is used for indicating a feedback state of the sidelink channel state information.

In an embodiment, the feedback state includes at least one of: a feedback manner of the channel state information or a feedback format of the channel state information.

In an embodiment, the feedback manner includes at least one of the following: currently sent sidelink data includes sidelink traffic data; currently sent sidelink data includes feedback information of sidelink channel state measurement; or currently sent sidelink data includes sidelink traffic data and feedback information of sidelink channel state measurement.

In an embodiment, the feedback format includes at least one of the following: a multiplexing relationship between the feedback information and a PSSCH; a modulation manner of the channel state information; a coding manner of the channel state information; a code rate of the channel state information; a content of the channel state information; or the number of layers of the channel state information reference signal.

According to the information feedback device in this embodiment and the information feedback method in this embodiment, the second UE determines the feedback resource of the CSI according to the set time information or re-acquires the feedback resource and feeds back the sidelink CSI to the first UE based on the determined feedback resource, thereby implementing the channel state measurement of the sidelink and improving the reliability of sidelink communication.

Embodiments of the present application further provide a communication node. The signal sending method may be performed by a signal sending device which may be implemented by software and/or hardware and integrated in the communication node. The communication node is a first user equipment that sends a sidelink channel state information reference signal.

Figure 14:
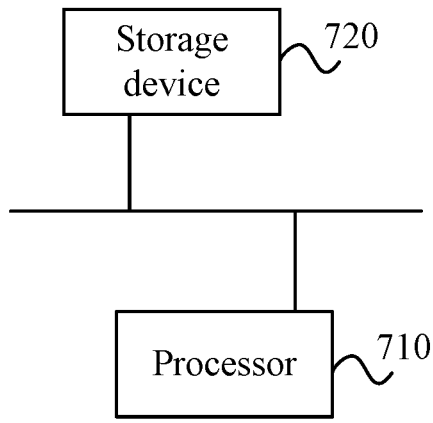
FIG. 14 is a structural diagram of a communication node according to an embodiment.

FIG. 14 is a structural diagram of a communication node according to an embodiment. As shown in FIG. 14, the communication node provided in this embodiment includes a processor 710 and a storage device 720. The communication node may include one or more processors. One processor 710 is shown as an example in FIG. 14. The processor 710 and the storage device 720 in the equipment may be connected via a bus or in other manners. The connection via the bus is shown as an example in FIG. 14.

One or more programs are executed by one or more processors 710 to cause the one or more processors to perform the signal sending method in any one of the preceding embodiments.

The storage device 720 in the communication node, as a computer-readable storage medium, may be configured to store one or more programs which may be software programs, computer-executable programs, and modules, such as program instructions/modules (for example, modules in the signal sending device, which include a configuration information acquisition module 410 and a sending module 420, as shown in FIG. 11) corresponding to the signal sending method in embodiments of the present application. The processor 710 executes software programs, instructions, and modules stored in the storage device 720 to perform various function applications and data processing of the communication node, that is, to implement the signal sending method in the preceding method embodiments.

The storage device 720 mainly includes a program storage region and a data storage region. The program storage region may store an operating system and an application program required by at least one function. The data storage region may store data (such as configuration information and first indication information in the preceding embodiments) created based on use of the equipment. Additionally, the storage device 720 may include a high-speed random-access memory and may further include a nonvolatile memory, such as at least one magnetic click memory, a flash memory, or another nonvolatile solid-state memory. In some examples, the storage device 720 may further include memories which are remotely disposed with respect to the processor 710. These remote memories may be connected to the communication node via a network. Examples of the preceding network include, but are not limited to, the Internet, an intranet, a local area network, a mobile communication network, and a combination thereof.

When the one or more programs included in the preceding communication node are executed by the one or more processors 710, the following operations are implemented: acquiring configuration information of sidelink reference signal resources; and sending a channel state information reference signal on a sidelink data channel according to the configuration information, and indicating first indication information through sidelink control information.

The communication node provided in this embodiment and the signal sending method provided in the preceding embodiments belong to the same concept. For technical details not described in detail in this embodiment, reference may be made to any one of the preceding embodiments. Embodiments of the present application further provide a communication node. The signal receiving method may be performed by a signal receiving device which may be implemented by software and/or hardware and integrated in the communication node. Alternatively, the information feedback method may be performed by an information feedback device which may be implemented by software and/or hardware and integrated in the communication node. The communication node is a second user equipment that receives a sidelink channel state information reference signal and feeds back a channel state.

Figure 15:
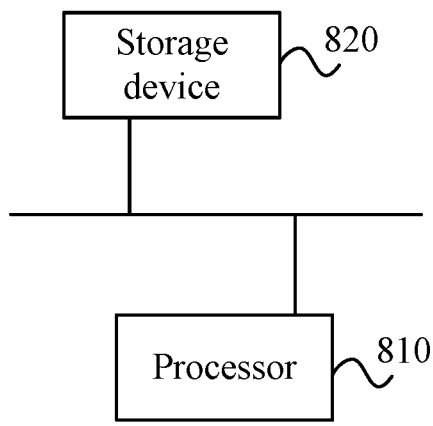
FIG. 15 is a structural diagram of another communication node according to an embodiment.

FIG. 15 is a structural diagram of another communication node according to an embodiment. As shown in FIG. 15, the communication node provided in this embodiment includes a processor 810 and a storage device 820. The communication node may include one or more processors. One processor 810 is shown as an example in FIG. 15. The processor 810 and the storage device 820 in the equipment may be connected via a bus or in other manners. The connection via the bus is shown as an example in FIG. 15.

One or more programs are executed by one or more processors 810 to cause the one or more processors to perform the signal receiving method or the information feedback method in any one of the preceding embodiments.

The storage device 820 in the communication node, as a computer-readable storage medium, may be configured to store one or more programs which may be software programs, computer-executable programs, and modules, such as program instructions/modules (for example, modules in the signal receiving device including an indication information receiving module 510 and a reference signal receiving module 520, as shown in FIG. 12) corresponding to the signal receiving method in embodiments of the present application. The processor 810 executes software programs, instructions, and modules stored in the storage device 820 to perform various function applications and data processing of the communication node, that is, to implement the signal sending method in the preceding method embodiments.

The storage device 820 mainly includes a program storage region and a data storage region. The program storage region may store an operating system and an application program required by at least one function. The data storage region may store data (such as indication information and first indication information in the preceding embodiments) created based on use of the equipment. Additionally, the storage device 820 may include a high-speed random-access memory and may further include a nonvolatile memory, such as at least one magnetic click memory, a flash memory, or another nonvolatile solid-state memory. In some examples, the storage device 820 may further include memories which are remotely disposed with respect to the processor 810. These remote memories may be connected to the communication node via a network. Examples of the preceding network include, but are not limited to, the Internet, an intranet, a local area network, a mobile communication network, and a combination thereof.

The communication node provided in this embodiment and the signal receiving method or the information feedback method provided in the preceding embodiments belong to the same concept. For technical details not described in detail in this embodiment, reference may be made to any one of the preceding embodiments. Embodiments of the present application further provide a storage medium including a computer-executable instruction. The computer-executable instruction, when executed by a processor of a computer, is used for performing a signal sending method or a signal receiving method or an information feedback method.

From the preceding description of embodiments, it is to be understood by those skilled in the art that the present application may be implemented by software and general-purpose hardware or may be implemented by hardware. Based on this understanding, the technical solutions of the present application may be embodied in the form of a software product. The software product in a computer may be stored in a computer-readable storage medium such as a floppy disk, read-only memory (ROM), random-access memory (RAM), flash memory, hard disk, or optical disk in the computer and includes multiple instructions for enabling a computer device (which may be a personal computer, a server, or a network device) to perform the method in any embodiment of the present application.

The above are only exemplary embodiments of the present application and are not intended to limit the scope of the present application.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type suitable for a local technical environment and may be implemented by using any suitable data storage technology, such as, but not limited to, a ROM, a RAM, an optical storage device and system (a digital versatile disc (DVD) or a compact disk (CD)), and the like. Computer-readable media may include non-transitory storage media. A data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on multi-core processor architecture.

What is claimed is:

1. An information feedback method, the method being performed by a first user equipment and comprising:
    determining a feedback resource of sidelink channel state information according to set time information; and
    sending, to a second user equipment, the sidelink channel state information based on the feedback resource,
    wherein the set time information comprises a set time window, and
    wherein determining the feedback resource of the sidelink channel state information according to the set time information comprises:
        in response to grant information of a physical sidelink shared channel (PSSCH) existing within the set time window, determining the feedback resource of the sidelink channel state information according to the grant information; and
        in response to the grant information of the PSSCH not existing within the set time window, re-acquiring the feedback resource of the sidelink channel state information.

2. The information feedback method of claim 1, wherein an end time of the set time window is a sum of a time offset and a time when a channel state information reference signal is received,
    wherein the time offset is configured by another user equipment.

3. The information feedback method of claim 1, wherein re-acquiring the feedback resource of the sidelink channel state information comprises:
    triggering a scheduling request, and acquiring a feedback resource on a sidelink indicated by a serving node.

4. The information feedback method of claim 1, wherein determining the feedback resource of sidelink channel state information according to set time information comprises:
    triggering autonomous resource selection, and
    obtaining the feedback resource for sending the sidelink channel state information.

5. An information feedback device, comprising:
    a processor configured to:
        determine a feedback resource of sidelink channel state information according to set time information; and
        send, to a user equipment via a feedback module, the sidelink channel state information based on the feedback resource,
    wherein the set time information comprises a set time window, and
    wherein the processor, when determining the feedback resource of the sidelink channel state information according to the set time information, is further configured to:
        in response to grant information of a physical sidelink shared channel (PSSCH) existing within the set time window, determine the feedback resource of the sidelink channel state information according to the grant information; and
        in response to the grant information of the PSSCH does not existing within the set time window, re-acquire the feedback resource of the sidelink channel state information.

6. The information feedback device of claim 5, wherein an end time of the set time window is a sum of a time offset and a time when a channel state information reference signal is received,
    wherein the time offset is configured by another user equipment.

7. The information feedback device of claim 5, wherein the processor, when re-acquiring the feedback resource of the sidelink channel state information, is further configured to:
    trigger a scheduling request, and acquire a feedback resource on a sidelink indicated by a serving node.

8. The information feedback device of claim 5, wherein the processor, when determining the feedback resource of sidelink channel state information according to set time information, is further configured to:
    trigger autonomous resource selection, and
    obtain the feedback resource for sending the sidelink channel state information.

9. A communication node, comprising:
    at least one processor; and
    a storage device, which is configured to store at least one program, wherein the at least one program is executed by the at least one processor to cause the at least one processor to:

determine a feedback resource of sidelink channel state information according to set time information; and send, to a user equipment via a sending module, the sidelink channel state information based on the feedback resource, wherein the set time information comprises a set time window, and wherein the processor, when determining the feedback resource of the sidelink channel state information according to the set time information, is further configured to:

in response to grant information of a physical sidelink shared channel (PSSCH) existing within the set time window, determine the feedback resource of the sidelink channel state information according to the grant information; and in response to the grant information of the PSSCH not existing within the set time window, re-acquire the feedback resource of the sidelink channel state information.

10. The communication node of claim 9, wherein an end time of the set time window is a sum of a time offset and a time when a channel state information reference signal is received, wherein the time offset is configured by another user equipment.

11. The communication node of claim 9, wherein the processor, when re-acquiring the feedback resource of the sidelink channel state information, is further configured to:

trigger a scheduling request, and acquire a feedback resource on a sidelink indicated by a serving node.

12. The communication node of claim 9, wherein the processor, when determining the feedback resource of sidelink channel state information according to set time information, is further configured to:

trigger autonomous resource selection, and obtain the feedback resource for sending the sidelink channel state information.

* * * * *